United States Patent
Lukach

(10) Patent No.: US 10,047,902 B2
(45) Date of Patent: Aug. 14, 2018

(54) MOUNTING SYSTEM AND METHOD

(71) Applicant: Huk TV Mounts L.L.C., Pewaukee, WI (US)

(72) Inventor: Samuel Lukach, Pewaukee, WI (US)

(73) Assignee: HUK TV Mounts L.L.C., Marco Island, FL (US)

( * ) Notice: Subject to any disclaimer, the term of this patent is extended or adjusted under 35 U.S.C. 154(b) by 135 days.

(21) Appl. No.: 15/097,052

(22) Filed: Apr. 12, 2016

(65) Prior Publication Data
US 2016/0298806 A1 Oct. 13, 2016

Related U.S. Application Data

(60) Provisional application No. 62/146,657, filed on Apr. 13, 2015.

(51) Int. Cl.
*F16M 13/02* (2006.01)
*A47G 1/16* (2006.01)

(52) U.S. Cl.
CPC ........... *F16M 13/02* (2013.01); *A47G 1/1606* (2013.01); *F16M 13/022* (2013.01)

(58) Field of Classification Search
CPC ............. Y10S 248/917; Y10S 248/919; Y10S 248/92; A47G 1/1606; A47G 1/1613
See application file for complete search history.

(56) References Cited

U.S. PATENT DOCUMENTS

| | | | | |
|---|---|---|---|---|
| 6,559,829 B1 * | 5/2003 | Matsuo | ...................... | G09F 7/18 248/918 |
| 7,070,156 B2 * | 7/2006 | Liao | .................... | B60R 11/0235 248/225.21 |
| 7,316,379 B1 * | 1/2008 | Graham | ................. | F16M 11/18 248/298.1 |
| 7,441,739 B2 * | 10/2008 | Huang | ................... | F16M 13/02 248/292.14 |
| 7,624,959 B2 * | 12/2009 | Dozier | ................... | F16M 11/10 248/222.14 |
| 7,637,465 B2 * | 12/2009 | Huang | ................... | F16M 13/02 248/215 |
| 7,823,847 B2 * | 11/2010 | Bremmon | .............. | F16M 11/10 248/201 |
| 7,891,622 B1 * | 2/2011 | O'Keene | ................ | F16M 11/10 16/358 |
| 7,918,426 B2 * | 4/2011 | Short | ................... | F16M 11/105 248/225.11 |
| 8,070,121 B2 * | 12/2011 | Dozier | ................... | F16M 11/10 248/225.21 |

(Continued)

OTHER PUBLICATIONS

Chief Manufacturing Inc. Installation Instruction Booklet entitled "Installation Instructions PAC-390 Cube Wall Hanger Accesory", dated Nov. 5, 2004, 2 pages.

*Primary Examiner* — Bradley Duckworth
(74) *Attorney, Agent, or Firm* — Smith Keane LLP

(57) ABSTRACT

A system directed to the art of mounting systems is provided. A mounting system capable of mounting a television/monitor or other object to a wall or various other structures in a manner that is secure, level, and versatile is disclosed. The mounting system has a pair of hooks and a support member. The support member is configured to be mounted on a wall or other upstanding surface and the hooks are attachable to the back surface of a monitor and configured to receive the support member or other rail-type member.

8 Claims, 5 Drawing Sheets

(56) References Cited

U.S. PATENT DOCUMENTS

| | | | | |
|---|---|---|---|---|
| 8,104,726 B2* | 1/2012 | Hoernig | ............... | A47K 17/022 |
| | | | | 248/220.22 |
| 8,154,885 B2* | 4/2012 | Anderson | ............... | F16M 13/02 |
| | | | | 248/917 |
| 8,235,341 B2* | 8/2012 | Taylor | .................... | F16M 11/10 |
| | | | | 248/201 |
| 8,297,571 B2* | 10/2012 | Xue | ..................... | F16M 11/041 |
| | | | | 248/220.22 |
| 8,371,543 B2* | 2/2013 | Schneider | ............ | A47G 1/1606 |
| | | | | 248/224.8 |
| 8,456,808 B2* | 6/2013 | Grey | ...................... | F16M 11/10 |
| | | | | 248/201 |
| 8,550,415 B2* | 10/2013 | Sculler | ................. | H05K 5/0017 |
| | | | | 248/291.1 |
| 8,864,092 B2* | 10/2014 | Newville | ............... | F16M 11/08 |
| | | | | 248/123.11 |
| 8,910,804 B2* | 12/2014 | Kim | ..................... | F16M 11/045 |
| | | | | 211/87.01 |
| 8,958,200 B2* | 2/2015 | Bremmon | ............... | F16M 11/10 |
| | | | | 248/201 |
| 9,027,893 B2* | 5/2015 | Cheng | ................. | F16M 13/022 |
| | | | | 248/201 |
| 9,109,742 B2* | 8/2015 | Smith | .................... | F16M 11/10 |
| 9,182,078 B1* | 11/2015 | Cheng | ................... | G09F 9/3026 |
| 9,765,923 B2* | 9/2017 | Skull | ..................... | F16M 13/02 |
| 2006/0266900 A1* | 11/2006 | May | ..................... | A47B 95/008 |
| | | | | 248/220.22 |
| 2007/0023595 A1* | 2/2007 | Harmsen | ............. | A47G 1/1606 |
| | | | | 248/227.2 |
| 2012/0260549 A1* | 10/2012 | Andrulewich | ....... | A47G 1/1606 |
| | | | | 40/745 |

* cited by examiner

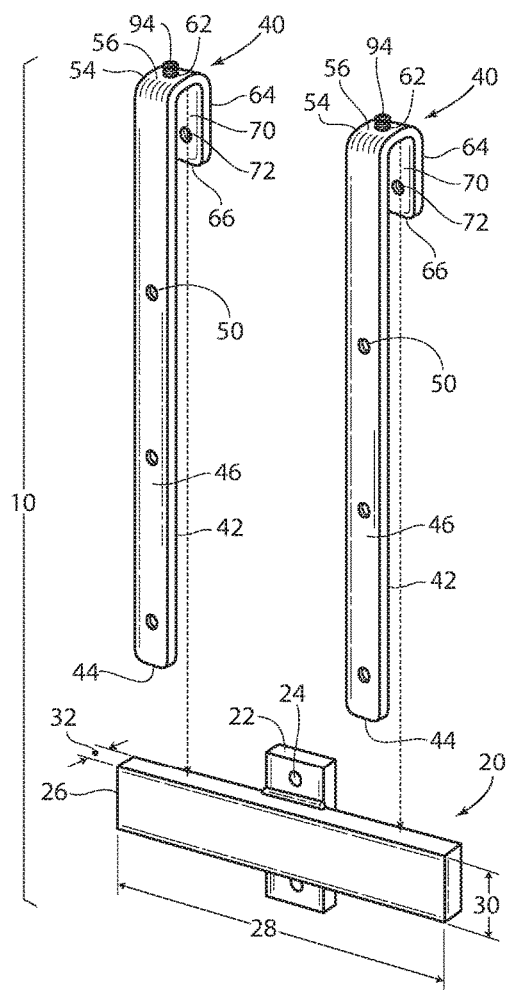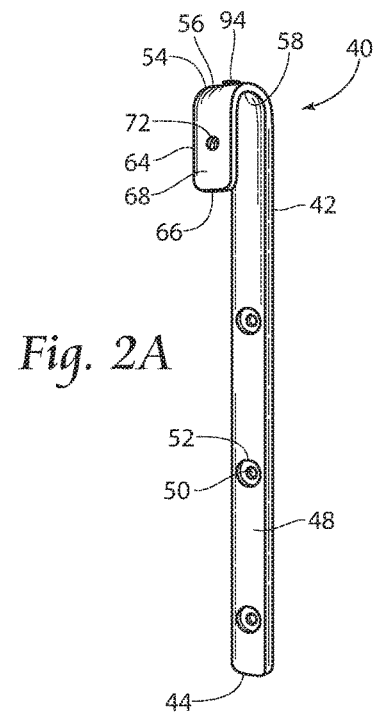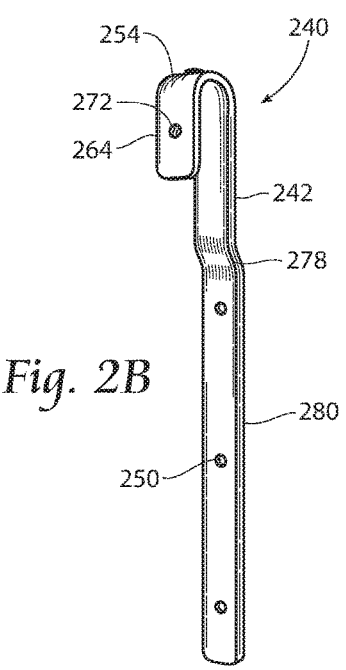
Fig. 1
Fig. 2A
Fig. 2B

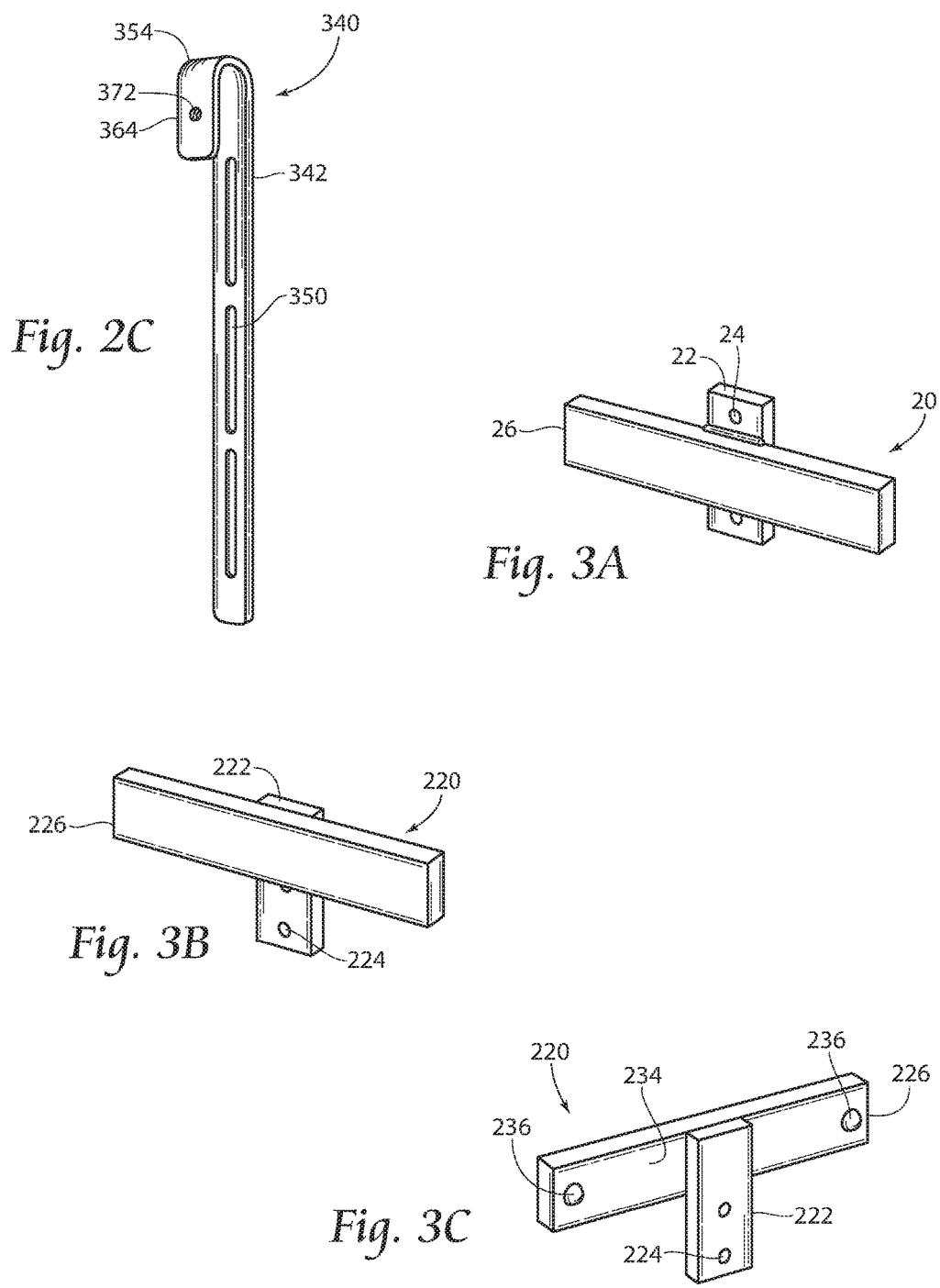

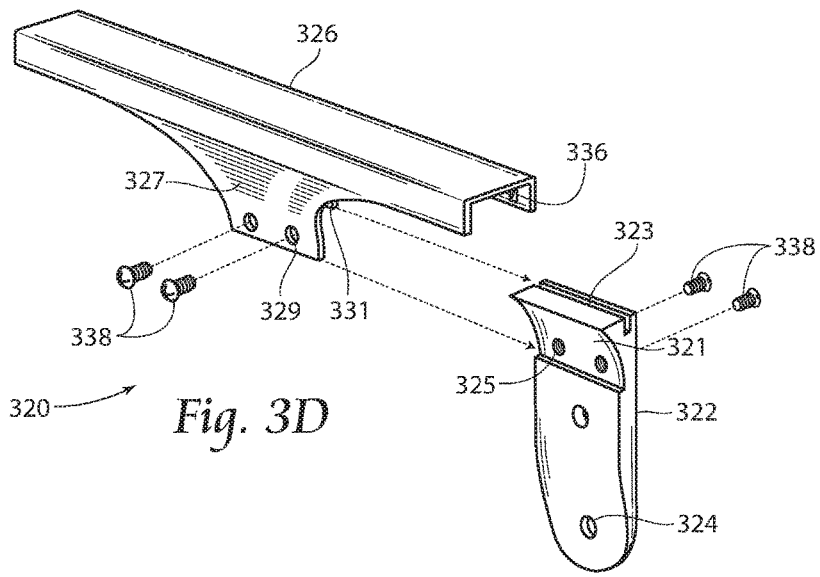
*Fig. 3D*
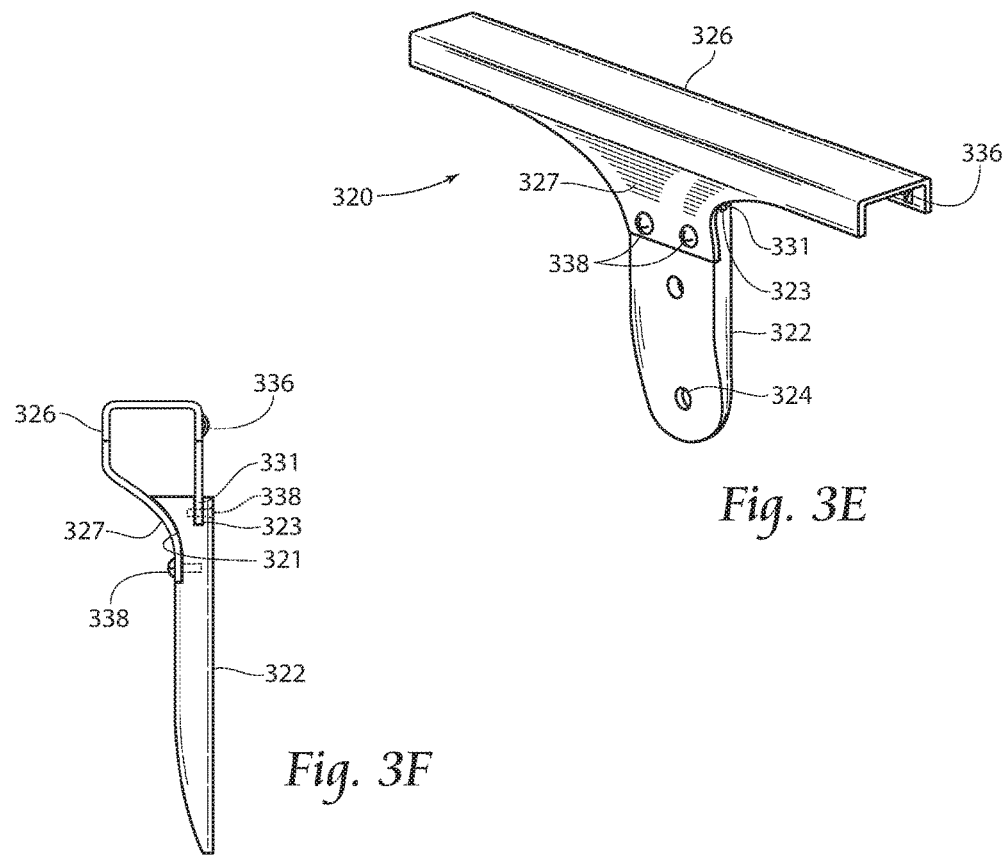
*Fig. 3E*
*Fig. 3F*

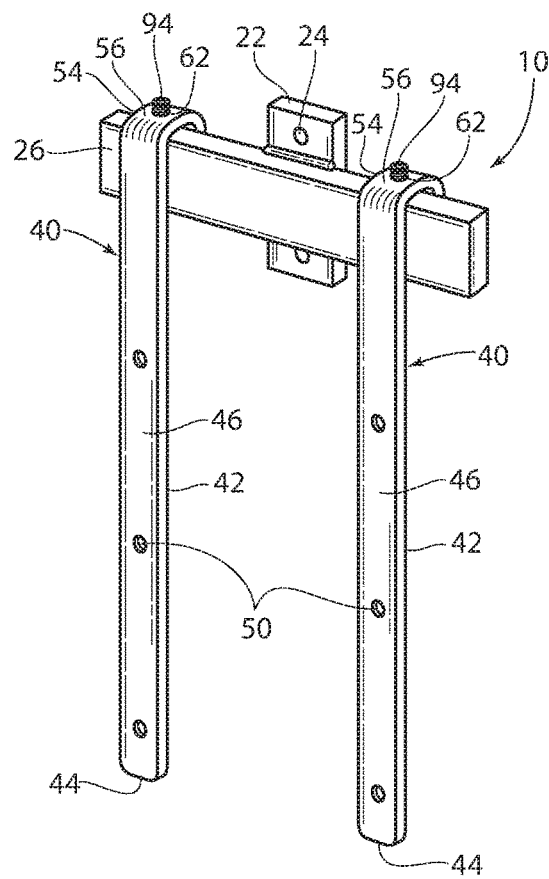
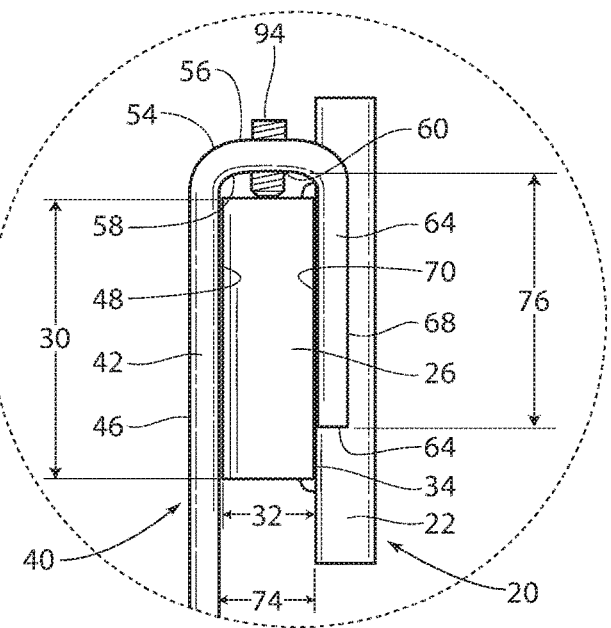
Fig. 4
Fig. 4A

MOUNTING SYSTEM AND METHOD

RELATED APPLICATIONS

This application claims the benefit of U.S. Provisional Patent Application Ser. No. 62/146,657, filed 13 Apr. 2015.

BACKGROUND OF THE INVENTION

Televisions have been a staple piece of entertainment equipment since the mid twentieth century. Until very recently, televisions have been fairly static pieces of furniture, generally relegated to a spot in a room and never moving from that spot. With the advancement of technology, television manufactures are making televisions that are lighter and less bulky; however, the television remains to be a piece of furniture that is static and immobile due to cumbersome wall mountings and placement-limited television bases.

The ability to move a television to various locations easily is something that has many potential advantages, including reducing cost by eliminating the need to purchase more televisions. Accordingly, the art of television mounting systems could benefit from a mounting system that offers the potential for placing a television in a multitude of locations.

SUMMARY OF THE INVENTION

The present invention relates to a mounting system capable of mounting a television/monitor or other object to a wall or various other structures in a manner that is secure, level, and versatile.

One aspect of the present invention provides a mounting system having a first hook member comprising a first hook shank, a first hook bend, and a first hook free end, wherein the first hook shank has a plurality of first hook shank through-holes located along the first hook shank; the first hook shank has a first shank surface and a second shank surface opposite the first shank surface, the first shank surface; and the second shank surface are substantially planar; the first hook free end has a free end surface, the free end surface is substantially planar and is substantially parallel to, and facing, the second shank surface of the first hook shank; a second hook member comprising a second hook shank, a second hook bend, and a second hook free end, wherein the second hook shank has a plurality of second hook shank through-holes located along the first hook shank; the second hook shank has a first shank surface and a second shank surface opposite the first shank surface, the first shank surface and the second shank surface are substantially planar; the second hook free end has a free end surface, the free end surface is substantially planar and is substantially parallel to, and facing, the second shank surface of the second hook shank; and the first hook member and the second hook member are configured to be affixed to a surface of an object by fasteners received through the plurality of first hook shank through-holes and the plurality of second hook shank through-holes.

The plurality of first hook shank through-holes and the plurality of second hook shank through-holes may be slots. Further, the first hook shank and the second hook shank may have offset sections.

The first and second hook members may also be configured to receive a support member between the second shank surface and the free end surface of the first and second hook members, respectively.

The first hook bend and the second hook bend may have threaded holes configured to receive threaded inserts, whereby the threaded inserts are contactable with the support member and adjustable to level the object.

Additionally or alternatively, the mounting apparatus may further comprise a support member having a base and a beam; the beam having a beam length, a beam height, a beam width, and a beam rear surface; whereby the beam width is configured to be received between the second shank surface and the free end surface of each of the first and second hook members, respectively. Further, the first and second hook members may have a gap distance defined as the distance from the second shaft surface to the free end surface of the first and second hook members, respectively; and whereby the beam width is substantially similar to the gap distance.

Additionally or alternatively, the beam may have a rear surface from which two tabs project and between which the free end of the first and second hook members are located.

Further, the beam may be removably attachable to the base. The beam may also comprise a first beam mating portion and a second beam mating portion and the base may have a base mating portion and a base slot; the first beam mating surface may be configured to be secured to the base mating portion with at least one fastener; and the base slot may be configured to receive the second beam mating portion, wherein the second beam portion is secured to the base with at least one fastener.

Another aspect of the present invention provides a method of mounting an object including the steps of: providing a first hook member comprising a first nook shank, a first hook bend, and a first hook free end, wherein the first hook shank has a plurality of first hook shank through-holes; the first hook shank has a first shank surface and a second shank surface opposite the first shank surface, the first shank surface and the second shank surface are substantially planar; the first hook free end has a free end surface, the free end surface is substantially planar and is substantially parallel to, and facing, the second shank surface of the first hook shank; providing a second hook member comprising a second hook shank, a second hook bend, and a second hook free end, wherein the second hook shank has a plurality of second hook shank through-holes located along the first hook shank; the second hook shank has a first shank surface and a second shank surface opposite the first shank surface, the first shank surface and the second shank surface are substantially planar; the second hook free end has a free end surface, the free end surface is substantially planar and is substantially parallel to, and facing, the second shank surface of the second hook shank; affixing the first hook member and the second hook member to a surface of the object with fasteners received through the plurality of first hook shank through-holes and the plurality of second hook shank through-holes; providing a support member; and receiving the support member between the second shank surface and the free end surface.

Additionally or alternatively, the first hook bend and the second hook bend may each have a threaded hole configured to receive threaded inserts and the method further includes the steps of: providing threaded inserts; installing the threaded inserts within the threaded holes in the first hook bend and the second hook bend; contacting the threaded inserts with the support member; leveling the object by adjusting the threaded inserts within the first and second hook bends and against the support member.

The support member may have a base, and the method may further comprise the step of securing the base to a structure.

BRIEF DESCRIPTION OF THE DRAWINGS

FIG. 1 is an exploded view of a mounting system according to the present invention.

FIG. 2A is a perspective view of a first embodiment of a hook according to the present invention as shown in FIG. 1.

FIG. 2B is a perspective view of a second embodiment of a hook according to the present invention.

FIG. 2C is a perspective view of a third embodiment of a hook according to the present invention.

FIG. 3A is a perspective view of a first embodiment of a support member according to the present invention as shown in FIG. 1.

FIG. 3B is a perspective view of a second embodiment of a support member according to the present invention.

FIG. 3C is a perspective view of the support member shown in FIG. 3B.

FIG. 3D is an exploded perspective view of a third embodiment of a support member according to the present invention.

FIG. 3E is a perspective view of the support member shown in FIG. 3D assembled.

FIG. 3F is a side elevation view of the support member shown in FIG. 3E.

FIG. 4 is a perspective view of the mounting system according to the present invention.

FIG. 4A is a close-up side view; of mounting system as shown in FIG. 4.

DESCRIPTION OF THE PREFERRED EMBODIMENT

Figure 5:
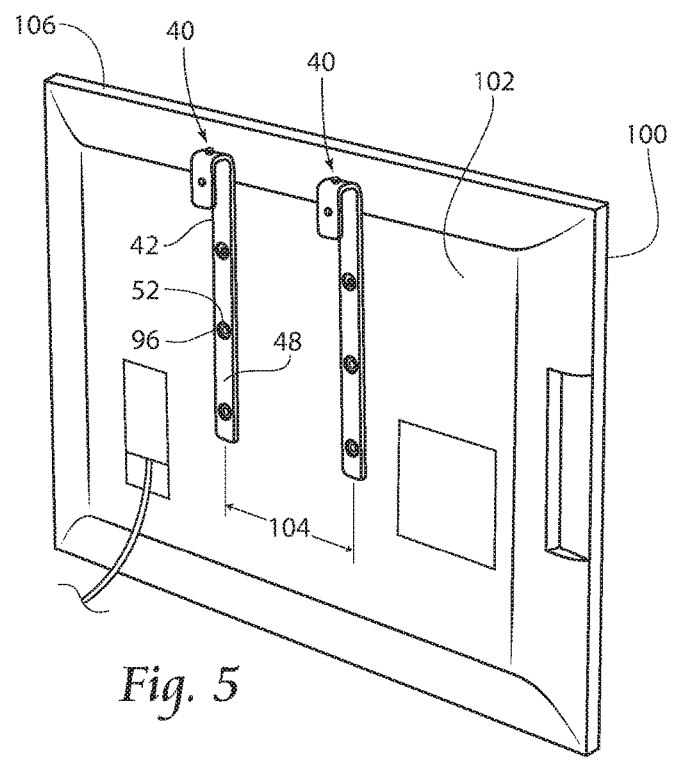
FIG. 5 is a perspective view of the mounting system according to the present invention attached to a television/monitor.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Looking to FIG. 1, a mounting system 10 according to the present invention is shown. The mounting system 10 comprises a support member 20 and hooks 40. It should be noted that although the present invention is discussed with respect to the application of mounting a television/monitor, it is contemplated that the mounting system 10 may be applied to other object for mounting as well, including, but not limited to, art and furniture.

A first embodiment 40 of the hooks 40 are shown in FIG. 2A. The hooks 40 are preferably sized and configured to mount to the back surface 102 of a flat-screen television 100 (see FIG. 5) or other type of monitor and engage with the support member 20 or other type of rail 90 (see FIG. 7). The hook 40 is preferably formed from a singular piece of metal; however, other materials are contemplated. The hook 40 comprises a shank 42, a bend 54, and a free end 64.

Continuing to look at FIG. 2A, the shank 42 is shown extending from a shank distal end 44 to the bend 54 and has a first shank surface 46 opposite a second shank surface 48. The first and second shank surfaces 46,48 are preferably substantially planar and parallel.

A plurality of shank through-holes 50 are positioned along the shank 42 and extend through the shank 42 from the first shank surface 46 through the second shank surface 48. Preferably a plurality of recesses 52 extend from the second shank surface 48 towards the first shank surface 46 and are aligned coaxially with each shank through-hole 50. The recesses 52 provide an area in which the heads of attachment screws 96 are recessed so as not to project beyond the shank second surface 48 (see FIG. 5).

It is further contemplated that the hook 40 can be configured to be compliant with Mounting Interface Standards (MIS) according to the Video Electronics Standards Association (VESA).

The bend 54 extends from the shank 42 to the free end 64 in a substantially U-shape configuration and has a first bend surface 56 and a second bend surface 58. Preferably the second bend surface 58 comprises a planar portion 60.

The free end 64 extends from the bend 54 to a free end distal end 66 and comprises a first free end surface 68 and a second free end surface 70 opposite the first free end surface 68. The first and second free end surfaces 68,70 are preferably substantially planar and parallel.

Looking at FIG. 4A, a side view of the hook 40 is shown. As illustrated, the second shank surface 48 is preferably substantially parallel with the second free end surface 70 and this pair of surfaces 48,70 define a gap distance 74. Further, the shank 42, bend 54, and free end 64 define a throat distance 76.

Additionally or alternatively, a bend threaded hole 62 extends from the first bend surface 56 through the second bend surface 58 and a free end threaded hole 72 extends from the first free end surface 68 through the second free end surface 70.

A second embodiment 240 of a hook is shown in FIG. 2B. The hook 240 has a shank 242 with an offset portion 278. The offset portion 278 offsets a section 280 of the shank 242 comprising the shank through-holes 250 away from the free end 264 of the hook 240; however, the offset shank section 280 preferably maintains a substantially parallel relationship with the hook free end 264.

A third embodiment 340 of a hook is provided in FIG. 2C. The hook 340 has a shank 342 with a plurality of shank slots 350. The shank slots 350 provide for greater adjustability of an attached monitor 100 (see FIG. 5).

Figure 6:
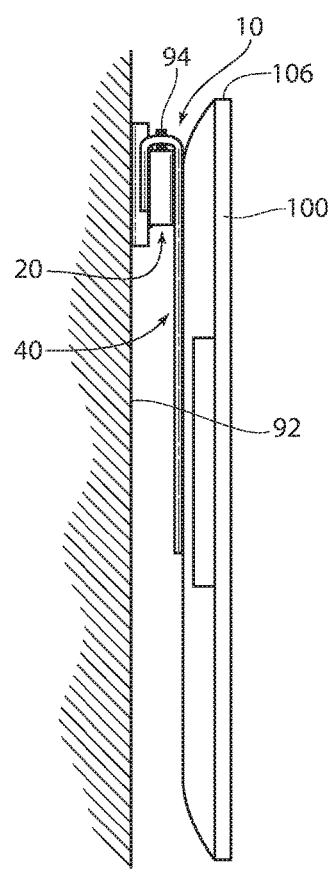
FIG. 6 is a side view of the mounting system according to the present invention.

Turning to FIG. 3A a preferred first embodiment 20 of the support member is illustrated. The support member 20 comprises a base 22 and a beam 26. The base 22 preferably comprises at least two base through-holes 24. The base 22 is contemplated as being configured to be securable to a wall 92 (see FIG. 6), preferably a wall stud (not shown) within the wall 92, or other support structure.

The beam 26 has a beam length 28, a beam height 30, a beam width 32, and a beam rear surface (see FIG. 4A). The beam 26 is preferably hollow.

The base 22 is solidly affixed to the beam rear surface 34, preferably perpendicular to the beam 26, with a base through-hole 24 above the beam 26 and a base through-hole 24 below the beam 26. The base 22 is preferably affixed to the beam 26 through welding, however other means of securing should be considered within the scope of the present invention.

A second embodiment 220 of a support member is illustrated in FIG. 3B. The base 220 is solidly mounted substantially perpendicular to the beam rear surface 234 with no base through-hole 224 above the beam 226 but with at least two base through-holes 224 below the beam 226.

Looking at FIGS. 1 and 5, it is preferable that the beam length 28 is greater than the distance 104 between the attachment inserts (hidden) provided on the back surface 102 of the television monitor 100. Additionally or alternatively, as shown in FIG. 3C and using the second embodiment support member 220 as an example, tabs 236 may be provided on the beam rear surface 234 to inhibit the hooks 40 from sliding off of the beam 226.

The beam width 32 is configured to be substantially approximately the same dimension as the gap distance 74. Additionally or alternatively, as illustrated in FIG. 4A, the throat distance 76 of the hook 40 is preferably greater than half the beam height 30.

The substantially similar dimensions of the beam width 32 relative to the gap distance 74 and the beam height 30 relative to the throat distance 76 promote a secure fit without the need to further mechanically secure the hooks 40 to the support member 20.

FIGS. 3D-3F illustrate a third embodiment 320 of a support member according to the invention. The support member 330 comprises a base 322 mateable with a beam 326.

The base 322 preferably has a base mating portion 321 with at least one base threaded hole 325, a base slot 323 with at least one base slot threaded hole (hidden), and at least one base through-hole 324.

The beam 326 preferably has a first beam mating portion 327 with at least one first beam mating portion through-hole 329 and a second beam mating portion 331 with at least one second beam mating portion through-hole (hidden). Preferably, the beam 326 has two flanges 336, similar in function to the tabs 236 on the beam 226 shown in FIG. 3C, provided to inhibit the hooks 40 from sliding off of the beam 326.

The base 322 and the beam 326 are preferably mated together with the second beam mating portion 331 received within the base slot 323 and the first beam mating portion 327 adjoining the base mating portion 321 as shown in FIG. 3E. The base 322 and the beam 326 are preferably secured together by inserting at least one fastener 338 through the at least one first beam mating portion through-hole 329 and into the at least one base threaded hole 325, and inserting at least one fastener 338 through the second beam mating portion 221 and into the base 322.

Continuing to look at FIG. 1, additionally or alternatively, a threaded insert 94 is shown received within the bend threaded hole 62. During or after installation, the threaded insert 64 may be used to level the television monitor 100 (see FIG. 6) by displacing the respective hook 40 up or down relative to the support member 20 upon turning the threaded insert 94 within the bend threaded hole 62.

Figure 7:
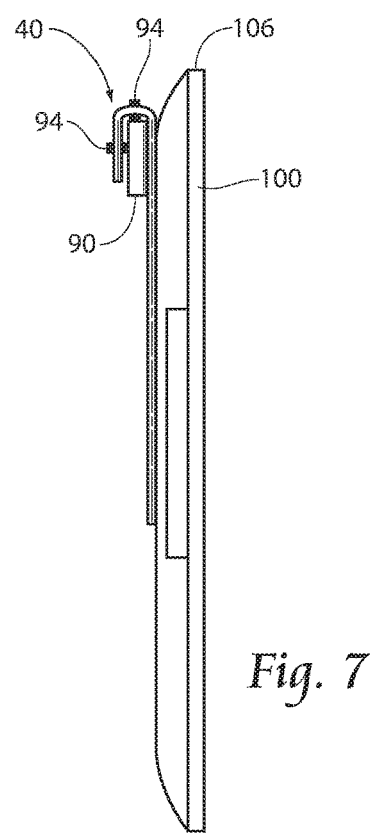
FIG. 7 is a side view of the mounting system according to the present invention.

Looking new to FIG. 7, the hooks 40 are configured to also be placed on various types of rails 90 as stated above. In an instance when the width of the rail 90 is less than the gap distance 74, threaded inserts 94 may be received within the free end threaded holes 72 and used to secure the hooks 40 to the rail 90 by turning the threaded insert 94 within the free end threaded hole 72 and against the rail 90.

Preferably, the mounting system 10 is comprised of materials known in the art to be weather resistant, as a non-limiting example, aluminum.

A method of mounting a television/monitor 100 with a back surface 102 and a top side 106 according to the present invention is provided herein. The method comprises the steps of providing a plurality of hooks 40. Each of the plurality of hooks 40 has a shank 42, a bend 54, and a free end 64. The shank 42 is substantially parallel to the free end 64 and joined together and spaced apart by the bend 54, defining a gap distance 74 between the shank 42 and the free end 64. The shank 42 has a plurality of shank through holes 50 configured to be alignable with attachment inserts recessed within the back surface 102 of the monitor 100. The bend 54 has a bend threaded hole 62 extending therethrough and configured to receive a threaded insert 94. The free end 64 has a free end threaded hole 72 extending therethrough configured to receive a threaded insert 94. The method continues, securing each shank 42 of the plurality of hooks 40 to the back surface 102 of the monitor 100 with the bends 54 positioned nearest the top side 106 of the monitor 100. Providing a support means to be received between the hook shank 42 and the hook free end 64, and receiving the support means between the hook shank 42 and the hook free end 64.

The method may further comprise the steps of providing threaded inserts 94, threading the threaded inserts 94 within the bend threaded holes 62, turning the threaded inserts 94 within the bend threaded holes 62, and displacing the plurality of hooks 40 up or down relative to the supporting means to level the monitor 100.

The supporting means may comprise a support member 20. The support member 20 has a base 22 with base through-holes 24 solidly affixed to a beam 26 with a beam width 32. The beam width 32 is substantially similar to the gap distance 74. Whereby, the beam 26 is received by the hook 40 between the hook free end 64 and the hook shank 42.

The method may further comprise the steps of providing threaded inserts 94, threading the threaded inserts 94 within the free end threaded holes 72, turning the threaded inserts 94 within the free end threaded holes 72, and tightening the hooks 40 to the supporting means.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A mounting system comprising:
    a first hook member comprising a first hook shank, a first hook bend, and a first hook free end, wherein the first hook shank has a plurality of first hook shank through-holes located along the first hook shank;
    the first hook shank has a first shank surface and a second shank surface opposite the first shank surface, the first shank surface and the second shank surface are substantially planar;
    the first hook free end has a free end surface, the free end surface is substantially planar and is substantially parallel to, and facing, the second shank surface of the first hook shank;
    the plurality of first hook shank through-holes extend from the first shank surface through the second shank surface of the first hook shank;
    a second hook member comprising a second hook shank, a second hook bend, and a second hook free end, wherein the second hook shank has a plurality of second hook shank through-holes located along the first hook shank;

the second hook shank has a first shank surface and a second shank surface opposite the first shank surface, the first shank surface and the second shank surface are substantially planar;

the second hook free end has a free end surface, the free end surface is substantially planar and is substantially parallel to, and facing, the second shank surface of the second hook shank;

a support member having a base and a beam, wherein the beam is removably attachable to the base;

whereby the beam has a beam length, a beam height, a beam width, and a beam rear surface; the beam width is configured to be received between the second shank surface and the free end surface of each of the first and second hook members, respectively;

the plurality of second hook shank through-holes extend from the first shank surface through the second shank surface of the second hook shank; and the first hook member and the second hook member are configured to be affixed to a surface of a monitor by fasteners received through the plurality of first hook shank through-holes and the plurality of second hook shank through-holes whereby the first shank surfaces of the first and second hook members are in direct contact with the surface of the monitor.

2. The mounting apparatus of claim 1, wherein the plurality of first hook shank through-holes and the plurality of second hook shank through-holes are slots.

3. The mounting apparatus of claim 1, wherein the first hook shank and the second hook shank have offset sections.

4. The mounting apparatus of claim 1, wherein the first and second hook members are configured to receive a support member between the second shank surface and the free end surface of the first and second hook members, respectively.

5. The mounting apparatus of claim 4, wherein the first hook bend and the second hook bend have threaded holes configured to receive threaded inserts, whereby the threaded inserts are contactable with the support member and adjustable to level the monitor.

6. The mounting apparatus of claim 1, wherein the first and second hook members have a gap distance defined as the distance from the second shank surface to the free end surface of the first and second hook members, respectively; and whereby the beam width is substantially similar to the gap distance for a majority of the beam height.

7. The mounting apparatus of claim 1, wherein the beam has a rear surface from which two tabs project and between which the free end of the first and second hook members are located.

8. The mounting apparatus of claim 1, wherein the beam comprises a first beam mating portion and a second beam mating portion and the base has a base mating portion and a base slot;

the first beam mating portion is configured to be secured to the base mating portion with at least one fastener; and the base slot is configured to receive the second beam mating portion, wherein the second beam mating portion is secured to the base with at least one fastener.

* * * * *